(12) United States Patent
Danielson et al.

(10) Patent No.: US 6,304,270 B1
(45) Date of Patent: Oct. 16, 2001

(54) METHOD AND APPARATUS FOR DETERMINING SIMPLE CONVEX POLYGONS

(75) Inventors: Brian H. Danielson, Tomball; David A. Dyches, Spring, both of TX (US)

(73) Assignee: Compaq Computer Corporation, Houston, TX (US)

( * ) Notice: Subject to any disclaimer, the term of this patent is extended or adjusted under 35 U.S.C. 154(b) by 1284 days.

(21) Appl. No.: 08/682,419

(22) Filed: Jul. 17, 1996

Related U.S. Application Data

(63) Continuation of application No. 08/323,244, filed on Oct. 14, 1994, now abandoned.

(51) Int. Cl.[7] .................................................. G06T 11/20
(52) U.S. Cl. ........................... 345/433; 345/441; 345/443
(58) Field of Search .................................... 396/133, 118, 396/141.3; 355/133, 118, 141, 143; 345/433, 418, 441, 443

(56) References Cited

U.S. PATENT DOCUMENTS

| | | | |
|---|---|---|---|
| 4,899,294 | * 2/1990 | Easton et al. | 364/522 |
| 4,901,251 | 2/1990 | Sfarti | 364/521 |
| 4,951,230 | * 8/1990 | Dalrymple et al. | 364/521 |
| 4,962,468 | * 10/1990 | Beauregard | 364/521 |

FOREIGN PATENT DOCUMENTS

| | | |
|---|---|---|
| 0323558A2 | 7/1989 | (EP) . |
| 0487060A2 | 5/1992 | (EP) . |
| 0511835A2 | 11/1992 | (EP) . |

OTHER PUBLICATIONS

Miller et al., "Mesh Computer Algorithms for Computational Geometry", *IEEE Transactions on Computers*, vol. 38, No. 3, Mar. 1989, pp 321–340.*

Jeong et al., "An Optimal Parallel Algorithm for Finding the Smallest Enclosing Rectangle on a Mesh–connected Computer", *Parallel Processing*, 1992 Symposium, 1992, pp. 138–141.*

DePano et al., "Minimum Enclosing Rectangles: A Comparative Investigation of Two Optimizing Criteria (Reprise)", *Southeastcon*, 1991, IEEE Conference Proceedings, 1991, pp. 60–64.*

Liou et al., "Minimum Rectangle Partition Problem for Simple Rectilinear Polygons", IEEE Transactions on Computer–aided Design of Integ. Circuit, vol. 9, No. 7, pp 720–733.*

"Efficient fracturing of all angle shaped VLSI mask pattern data", Pelz et al., VLSI Journal 10, (1991) Jan., No. 2, Amsterdam, NL, pp. 143–154.

* cited by examiner

*Primary Examiner*—Joseph H Field
(74) *Attorney, Agent, or Firm*—Sharp, Comfort & Merrett, P.C.

(57) ABSTRACT

An accelerated video controller operates in conjunction with a video driver to accelerate certain video operations. If the operating environment requests a polygon operation, the driver (or software on the video controller) will determine whether the specified polygon is simple convex. The determination of whether a convex polygon is simple convex is accomplished by tracing between the vertices of the polygon and comparing the changes in direction relative to a predetermine coordinate axis to a threshold number. If the polygon is simple convex, certain operations can be performed using simpler code or hardware accelerated features. For a polygon fill, if the polygon is simple convex, the edges of the polygon are inspected to determine whether the polygon can be decomposed into a rectangle and a smaller polygon. If so, the video controllers bit engine will be used to perform the fill of the rectangle at high speed, thus reducing the time of the operation.

15 Claims, 5 Drawing Sheets

SIMPLE CONVEX

COMPLEX CONVEX

METHOD AND APPARATUS FOR DETERMINING SIMPLE CONVEX POLYGONS

RELATED APPLICATIONS

This application is a continuation of application Ser. No. 08/323,244, filed Oct. 14, 1994, and entitled, "METHOD AND APPARATUS FOR DETERMINING SIMPLE CONVEX POLYGONS," now abandoned.

TECHNICAL FIELD OF THE INVENTION

This invention relates in general to computers, and more particularly to a method and apparatus for detecting simple convex polygons.

BACKGROUND OF THE INVENTION

The speed at which a personal computer operates is dependent upon a number of factors. Naturally, the speed of the microprocessor has a significant influence on the speed of operation of the overall computer system. Next to processor speed, in many cases, the video graphics subsystem has the most influence on the performance of the overall computer system. This is particularly true when a graphical user interface, such as MICROSOFT WINDOWS (by Microsoft Corporation of Redmond, Wash.) is used. In order to boost performance, most modem day personal computers use either a local video bus (which has a higher data bandwidth than the main peripheral bus) and an accelerated video card which increases the speed of certain operations. An accelerated video card allows the video card to perform selected video operations at high speed, rather than using the CPU to perform the operation. Hardware acceleration improves the operation of the computer system in two ways: (1) the CPU no longer needs to perform low-level video operations handled by the video card and (2) the data bandwidth for certain operations is greatly reduced, resulting in less bus traffic.

In order for acceleration to increase the responsiveness of the system, the operating environment, such as WINDOWS, must know the capabilities of the accelerated video subsystem. When the operating environment is loaded, it initiates the loading of a video driver, which is a program which acts as an intermediary between the operating environment and accelerated video hardware. The driver passes parameters to the operating environment which specify the accelerated capabilities of the video subsystem. Thereafter, when the operating environment needs to perform a video operation which could benefit from one of the accelerated capabilities, it passes the necessary data to the driver. The driver interprets the information from the operating environment, processes the information and passes data via the bus to the video subsystem. The video subsystem then performs the video operation by writing data to its frame buffer. As the market for accelerated video subsystems has matured, it has become apparent that the speed of the video subsystem is in large part dependent upon the operation of the video driver.

One class of driver functions (or "primitive") which can have a significant affect on the overall speed of the driver involves the polygon functions. WINDOWS supports two polygon primitives: Alternate Fill Polygon( ) and Winding Fill Polygon( ). These primitives are used to draw solid and outline polygon figures. In support of the primitive call, WINDOWS passes information relating to the desired polygon, such as (1) an ordered list of vertices in screen coordinates (the last coordinate may be omitted; if so, the first coordinate is assumed to be the last coordinate as well), pattern information, color information and border information. Based on this information the driver draws the polygon. The speed at which the driver can draw the polygon is dependent upon the efficiency of the code and whether the video board provides hardware support.

In certain instances, it would be beneficial to know if the polygon is convex, and if so, whether the polygon is simple convex. FIG. 1a illustrates a simple convex polygon 10 (defined by vertices 11 and edges 13) and FIG. 1b illustrates a complex convex polygon 12. A simple convex polygon has no intersecting lines, and therefore, a video driver primitive may be able to take advantage of simpler code in performing functions relating to the polygon, such as using a Cohen-Sutherland clipping method for clipping a polygon which is partially outside of a window. Further, certain hardware acceleration features may by exploited by the driver software in instances where the polygon is simple convex.

A method of determining whether a polygon is convex is described in "Procedural Elements for Computer Graphics" by David F. Rogers, pages 146–151 (McGraw-Hill 1985). This text provides two methods for determining if a polygon is convex. However, the first method (computing and comparing the cross products of adjacent edges of the polygon) does not accurately identify the distinction between simple and complex convex polygons. A second method described in the reference cited above, involves repeatedly translating the polygon such that the ith vertex is positioned on an origin and rotating the polygon about the origin to place the (i+1)th vertex is on the positive x-axis. After the rotation, the sign of the y component of the (i+2)th vertex is noted. This procedure is repeated for each vertex. While the translation steps can be done at high speed, the rotation steps are time consuming due to sine and cosine computations. Thus, while this second method can correctly identify the distinction between simple and complex convex polygons, the slowness of the method when implemented in the driver software makes it undesirable.

Therefore, a need has arisen in the industry for a method and apparatus for determining whether a polygon is a simple convex polygon.

SUMMARY OF THE INVENTION

In the present invention, the driver software distinguishing between simple and complex convex polygons in a computer to determine whether a requested operation can be executed at a faster speed. To determine whether a polygon is simple or complex convex the video driver, after receiving information on the vertices of the polygon, determines whether the polygon is convex. If so, a starting vertex is selected and the number of direction changes relative to a predetermined coordinate axis which result from tracing the polygon are determined. The number of direction changes are compared to a threshold number. If the number of direction changes exceed the threshold number, then the polygon is complex convex.

The present invention provides significant advantages over the prior art. First, the method can determine whether a polygon is simple or complex convex with little overhead with regard to either speed or code complexity. By quickly determining whether or not the polygon is simple convex, the driver can invoke certain techniques to speed operations which are not available to complex convex polygons.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

The preferred embodiment of the present invention and its advantages are best understood by referring to FIGS. 1–12 of the drawings, like numerals being used for like and corresponding parts of the various drawings.

Figure 1A:
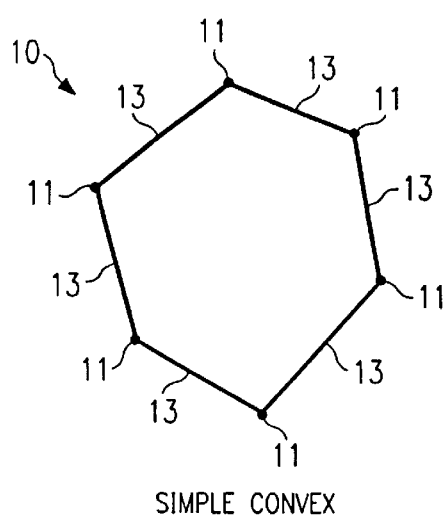
FIGS. 1a and 1b illustrate simple convex and complex convex polygons, respectively.
Figure 1B:
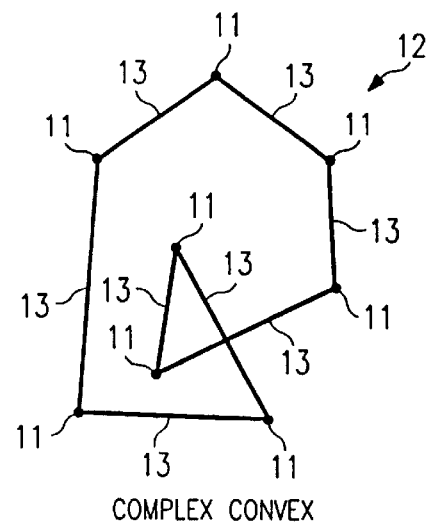
Figure 2:
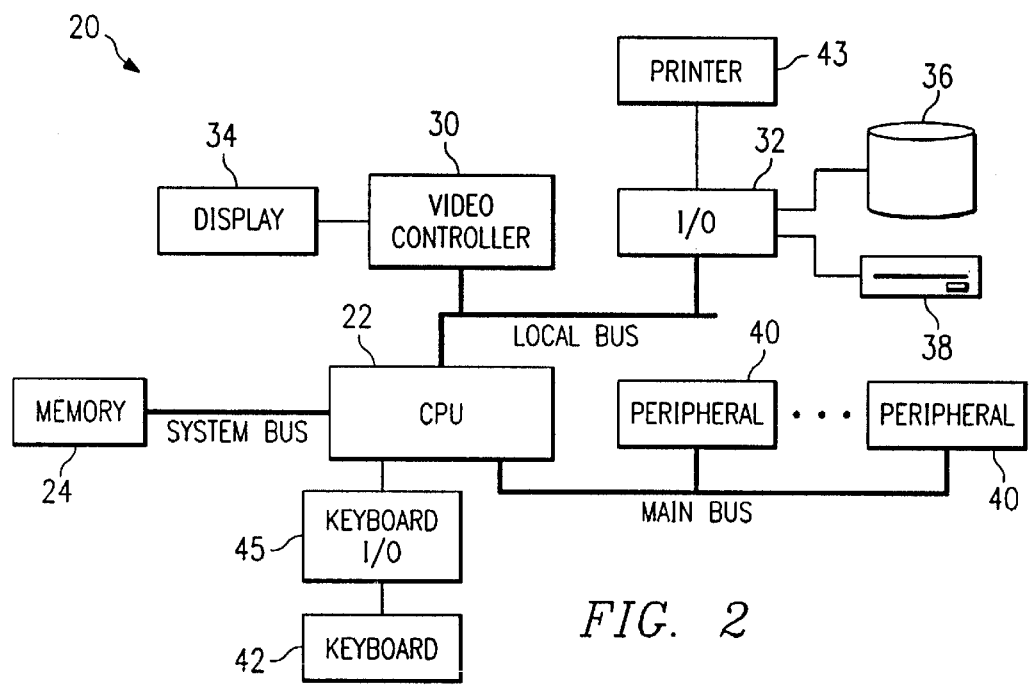
FIG. 2 illustrates a block diagram of a computer system.

FIG. 2 illustrates a block diagram of a computer system 20. The computer system 20 includes a microprocessor (or central processing unit) 22, coupled to memory 24, a local bus 26 and a main peripheral bus 28. A video controller 30 and I/O circuitry 32 are coupled to the local bus 26. A display 34 is coupled to the video controller 30. A hard disk 36 and floppy disk 38 are coupled to the I/O circuitry 32. A plurality of peripherals 40 are coupled to the main bus 28. A keyboard 42 is coupled to the CPU 22 through keyboard interface 45. A printer 43 is also coupled to I/O circuitry 32. The computer system 20 of FIG. 2 is an exemplary embodiment for a high performance computer system. Many computer systems vary from the architecture shown in FIG. 2, and the invention described herein would apply to various architectures. Further, the architecture shown in FIG. 2 is a basic architecture and many of the details have been removed for illustrative purposes.

Figure 3:
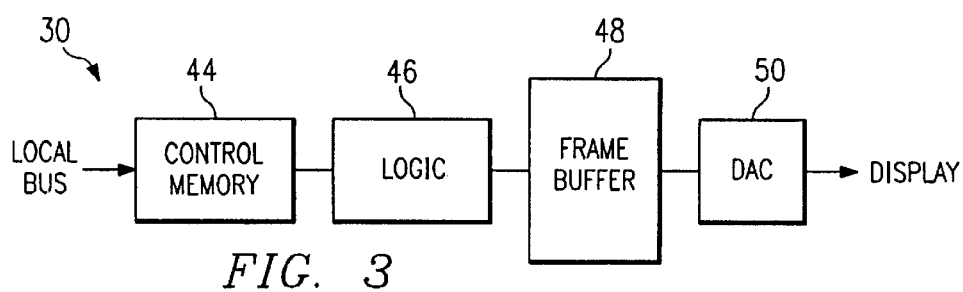
FIG. 3 illustrates a block diagram of a video controller.

FIG. 3 illustrates a more detailed block diagram of the video controller 30. The video controller 30 comprises a memory section 44, including control registers and buffers, logic 46 coupled to the memory section 44 and a frame buffer 48. The frame buffer 48 is connected to a digital-to-analog converter (DAC) 50 which outputs video information to the display 34 responsive to the data stored in the frame buffer.

The video driver is loaded into the computer system 20 at runtime along with the operating environment, such as WINDOWS. The video driver, along with the operating environment, is executed by the microprocessor 22 to perform calculations and communicate with the video controller 30. In operation, the video driver, responsive to instructions from the operating environment, outputs data and control signals to the video controller 30. Responsive to the data and control signals, logic 46 controls the flow of data to and from the frame buffer 48.

Figure 4:
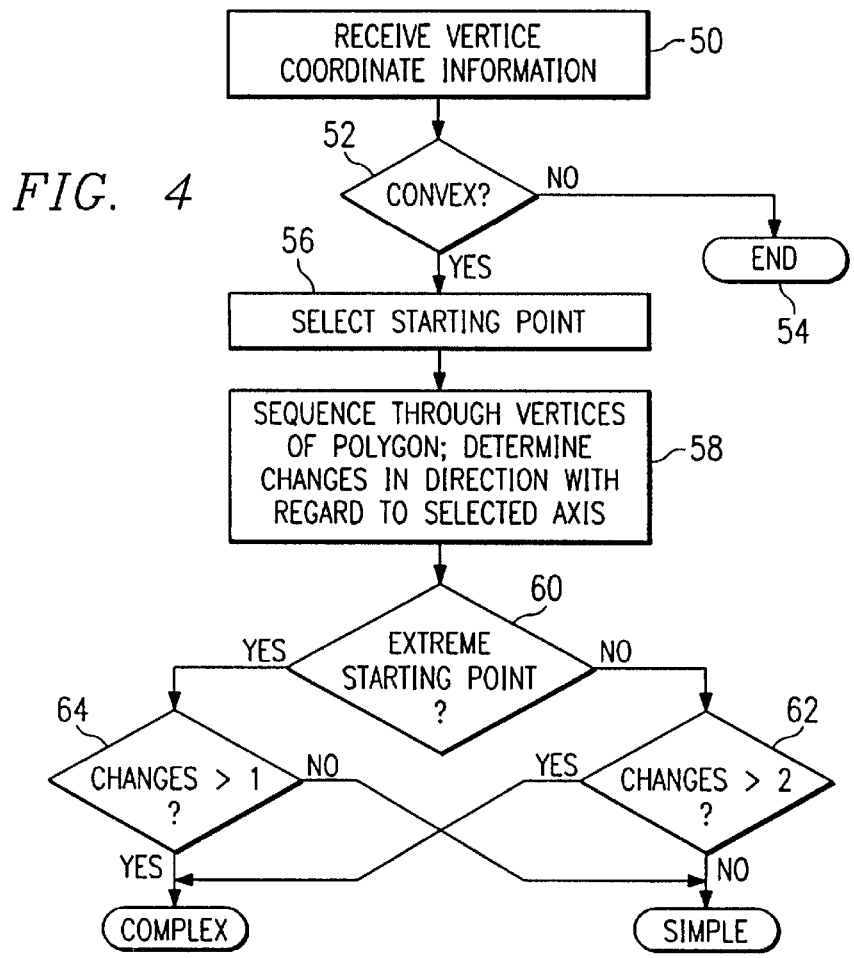
FIG. 4 illustrates a flow chart describing a method of determining whether a polygon is simple convex or complex convex.

FIG. 4 shows a flow diagram of a preferred embodiment of a method implemented by the driver software (or software imbedded in the hardware controller) for determining whether a polygon is a simple convex polygon. In step 50, the vertices of the polygon are received from the operating environment. Typically, as in WINDOWS, the vertices will be received in order and will be in screen coordinates (i.e., the coordinates will identify a pixel in the screens coordinate system). The vertices define the edges of the polygon.

In step 52, the driver determines whether the polygon is convex. A convex polygon can be identified by calculating the vector cross products of adjacent edges. If the signs of the vector cross products are all the same or zero (i.e., if the cross products are either [1] all positive or zero or [2] all negative or zero), then the polygon is convex. If the polygon has both positive and negative vector cross products, then the polygon is concave, and need not be considered further. If all of the cross products are zero, then the polygon is collinear, and need not be considered further. This method is discussed in greater detail in "Procedural Elements for Computer Graphics" by David F. Rogers, pages 146–151 McGraw-Hill 1985). Other methods of determining whether a polygon is convex may be used in place of the method set forth above.

If the polygon is not convex, the subroutine ends in block 54. Otherwise, in block 56, a starting point is selected from the vertex list. Any of the vertices can be chosen as a starting point; however, for simplicity, either the furthestmost vertex along a given axis (the right-most, left-most, top-most or bottom-most vertex) or the first vertex in the order received from the operating environment is typically chosen as the starting point. In block 58, the number of direction changes with respect to a selected axis are determined by tracing between the vertices of the polygon. Step 58 described in further detail in connection with FIGS. 5a–b, 6a–b and 7a–b.

Decision block 60 determines whether the starting point is at an extreme, relative to the other vertices, of the selected axis; i.e., it is the right-most or left-most vertex in cases where for an x-axis (horizontal axis) is selected or is the top-most or bottom-most vertex in cases where the y-axis (vertical axis) is selected. If the starting point is not an extreme starting point and the direction changes are greater than two in block 62, then the polygon is complex convex. If the starting point is not an extreme starting point and the direction changes are not greater than two in block 62, then the polygon is simple convex. If the starting point is an extreme starting point and the direction changes are greater than one in block 64, then the polygon is complex convex. If the starting point is an extreme starting point and the direction changes are not greater than one in block 64, then the polygon is simple convex.

Figure 5A:
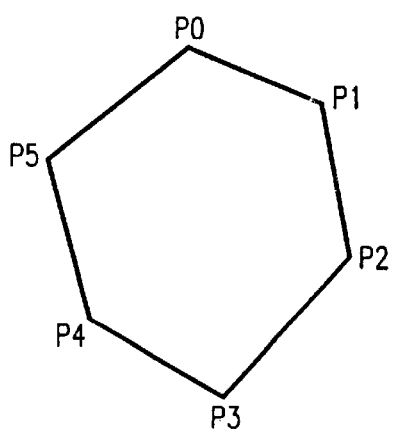
FIGS. 5a and 5b illustrate simple convex and complex convex polygons respectively for demonstrating the method of FIG. 4.
Figure 5B:
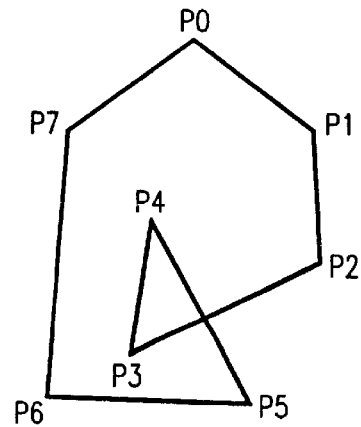
Figure 6A:
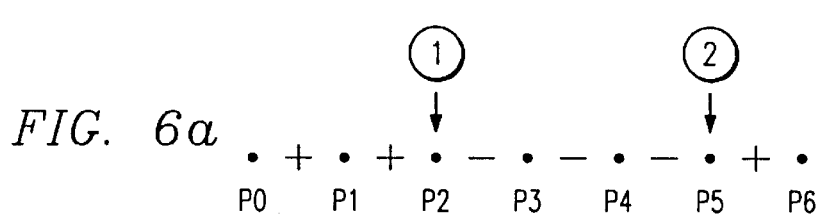
FIGS. 6a and 6b are diagrams showing the changes in direction relative to the x-axis in accordance with the method of FIG. 4 for the polygons shown in FIGS. 5a and 5b, respectively.

FIGS. 5a–b, 6a–b and 7a–b illustrate the method described in step 58 of FIG. 4. FIG. 5a illustrates a simple convex polygon with six vertices 11 and six edges 13. FIG. 5b illustrates a complex convex polygon with eight vertices 11 and eight edges 13. Using the method described above, it can be shown that both polygons are convex. FIG. 6a graphically illustrates the determination of changes in direction for the polygon of FIG. 5a where the x-axis is chosen. Point P0 is chosen for the starting point. For purposes of illustration it will be assumed that a rightward change is positive ("+") and a leftward change is negative ("−"). Hence, from P0 to P1, the offset in the x-direction is positive. From P1 to P2, the offset in the x-direction is also positive, so there is no change in direction. From P2 to P3, the offset in the x-direction is negative, therefore a first change in direction occurs. From P3 to P4 and from P4 to P5 the offset in the x-direction remains negative, so there is no change in direction associated with these edges. From P5 to P0, the offset in the x-direction is positive, resulting in a second change in direction. Since P0 is not an extreme start point relative to the x-axis (P2 and P5 are the extreme points), the polygon is determined to be simple convex.

Figure 6B:
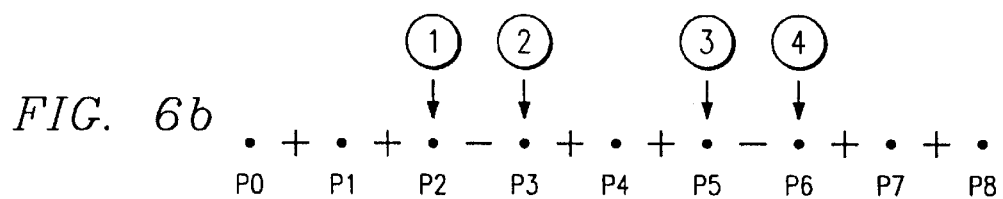

FIG. 6b shows the same analysis applied to the polygon of FIG. 5b. From P0 to P1 and from P1 to P2, the offset in the x-direction is positive. From P2 to P3, the offset is negative, resulting in a first change in direction. From P3 to P4, the offset in the x-direction is positive, resulting in a second change in direction. From P4 to P5, the offset in the x-direction remains positive. From P5 to P6, the offset in the x-direction is negative, resulting in a third change in direction. From P6 to P7 the offset in the x-direction is positive, resulting in a fourth change in direction. From P7 to P0, the change in direction is positive. Hence, the polygon of FIG. 5b has four changes in direction and is therefor complex convex.

Figure 7A:
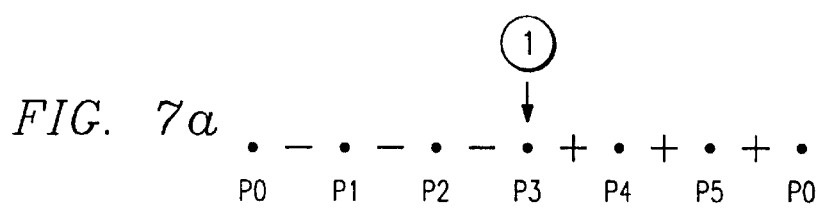
FIGS. 7a and 7b are diagrams showing the changes in direction relative to the y-axis in accordance with the method of FIG. 4 for the polygons shown in FIGS. 5a and 5b, respectively.
Figure 7B:
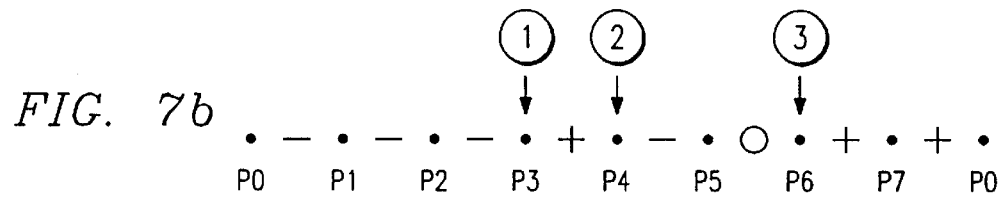

FIGS. 7a–b illustrate the same analysis as shown in FIGS. 6a–b, respectively, relative to the y-axis. In this case, it should be noted that P0 (for both polygons) is an extreme point, since it is the topmost point. In the analysis shown in FIGS. 7a–b it will be assumed that a downward offset is negative and an upward offset is positive.

Referring to FIG. 7a, from P0 to P1, the offset in the y-direction is negative. From P1 to P2, and from P2 to P3, the offset in the y-direction is also negative, so there is no change in direction. From P3 to P4, the offset in the y-direction is positive, therefore a first change in direction occurs. From P4 to P5 and from P5 to P0 the offset in the y-direction remains positive, so there is no change in direction associated with these edges. Because P0 is an extreme start point relative to the y-axis, the polygon is determined to be simple convex, since there is a single change in direction.

Referring to FIG. 7b, from P0 to P1, the offset in the y-direction is negative. From P1 to P2, and from P2 to P3, the offset in the y-direction is also negative, so there is no change in direction. From P3 to P4, the offset in the y-direction is positive, therefore a first change in direction occurs. From P4 to P5 the offset in the y-direction is negative, resulting in a second change in direction. From P5 to P6, there is no offset in the y-direction. A zero offset results in a "don't care" situation. The edge from P6 to P7 is positive in the y-axis, and hence a third change in direction results (the edge from P6 to P7 is compared to the edge from P4 to P5 to determine a change in direction, because of the intermediary zero offset). From P7 to P0, the offset is positive. Consequently, there are a total of three direction changes shown in FIG. 7b. Because P0 is an extreme start point relative to the y-axis, the polygon is determined to be complex convex, since there is more than a single change in direction.

It should be noted that the once the changes in direction exceed the number allowable (one or two depending upon whether the starting point is at an extreme), it can be determined that the polygon is complex convex without further analysis of the remaining edges.

The pseudo-code listed below illustrates code for analyzing whether a convex polygon is simple or convex. In this example, the leftmost vertex is chosen as P0.

```
Smaller_Flag=False
Larger_Flag=False
Flip_Flag=False
Polytype=Simple
For I = 1 to MaxNumberofVertices
    If I=MaxNumberofVertices
        J=1
    else
        J=I+1
    Endif
    If Vertex.X[I] < Vertex.X[J]
        Smaller_Flag=True
        If Larger_Flag=True
            If Flip_Flag=True
                Polytype=Complex
                End
            Endif
            Flip_Flag=True
            Larger_Flag=False
        Endif
    Else
        If Vertex.X[I] > Vertex.X[J]
            Larger_Flag=True
            If Smaller_Flag=True
                If Flip_Flag=True
                    Polytype=Complex
                    End
                Endif
                Flip_Flag=True
                Smaller_Flag=False
            Endif
        Endif
    Endif
Next I
End
```

The pseudo-code set forth above minimizes the time taken to detect a complex convex polygon, since it will return after two direction changes are made; however, some preliminary steps must be taken to determine a vertex at an extreme (in this case the leftmost vertex). Since all complex convex polygons will have at least three direction changes, regardless of the starting vertex, an alternative embodiment could start at any vertex, and count the changes in direction until at least three were found. If so, the polygon would be complex; otherwise, if less than three direction changes were found, the polygon would be simple. This alternative method eliminates time in selecting a starting vertex, but requires more time in counting direction changes (since three must be detected, rather than two).

This aspect of the invention provides significant advantages over the prior art. First, the detection of simple convex polygons is fast, so the detection of the simple convex polygon does not materially diminish the speed increases which may be had once the determination is made. Second, it can be easily implemented in code.

Figure 9:
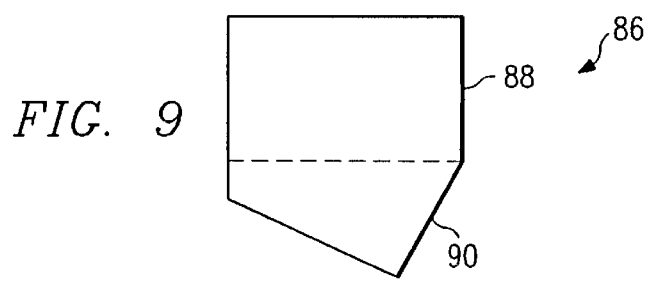
FIG. 9 shows a diagram of a polygon which can be decomposed in accordance to the method shown in FIG. 8.
Figure 8:
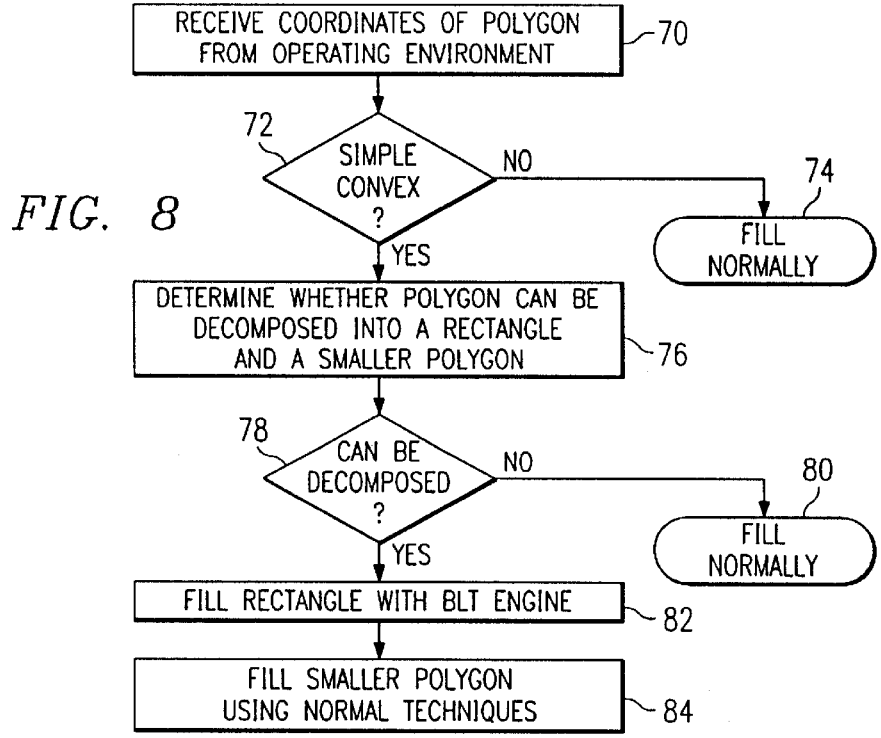
FIG. 8 is a flow chart describing a method of accelerating polygon fills.
Figure 10:
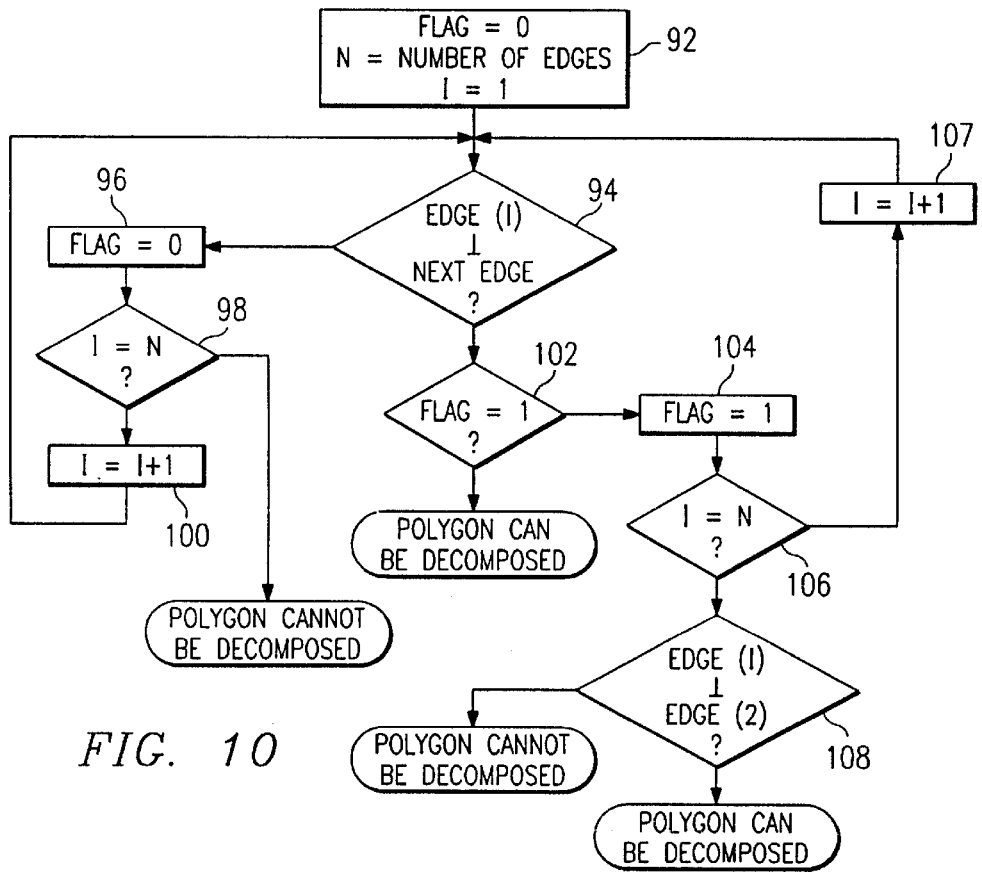
FIG. 10 is a flow chart describing a method of determining whether a polygon can be decomposed into a rectangle and smaller polygon.

Once it has been determined that a polygon is simple convex, the hardware acceleration features of the video controller 30 may be used to increase the speed with which certain operations are performed. FIGS. 8–10 illustrate a method of reducing the time needed for a polygon fill. A polygon fill involves filling the outline of the polygon (or the portion which is not clipped by a window) by coloring the interior with a specified pattern using specified colors. In the prior art, polygon fills are performed, using scan conversion in which the fill is performed one scan line at a time based on an edge list which defines the edges of the polygon.

Once it has been determined that a polygon is simple convex, the time to fill a polygon can be decreased by use of the bit block transfer engine, commonly known as the "blt engine" (see FIG. 3), which is part of logic 46. A blt engine is a common feature of most accelerated video cards. FIG. 8 illustrates a flow diagram of the basic operation of this aspect of the preferred embodiment.

In block 70, the polygon information described above (vertices, border, fill information, and so on) is passed from the operating environment to the video driver in furtherance of a polygon fill function. In decision block 72, the driver (or hardware) determines whether the polygon is simple convex. If not, the polygon fill is processed under normal procedures for a polygon which is not simple complex in block 74. In block 76, the vertices of the polygon are inspected by the video driver to determine whether the polygon can be decomposed into a rectangle and a smaller polygon. If the polygon can not be decomposed, then the polygon is filled normally in block 80, for example, by scan conversion. If the polygon can be decomposed, then the video driver instructs the video controller 30 to fill the rectangle using the blt engine in block 82 (or other hardware accelerated rectangle fill). In block 84, the smaller polygon is filled by the driver using normal techniques; it may be possible to decompose the smaller polygon into another rectangle and polygon using the technique described above.

This type of polygon which can be decomposed into a rectangle and a smaller polygon is shown graphically in FIG. 9. The simple convex polygon 86 has a rectangular portion 88 and a smaller polygon portion 90. The rectangular portion 88 can be filled at high speed using a blt engine. The remaining smaller polygon can be filled using the scan conversion process or other appropriate technique.

FIG. 10 illustrates a flow chart describing in detail the step shown in block 76 of FIG. 8, i.e., a method for determining whether a polygon can be decomposed into a rectangle and a smaller polygon. In general, the method set forth in FIG. 10 determines whether three consecutive edges result in two consecutive 90 degree angles. In block 92, variables I, N and Flag are initialized. Flag is set to "1" when two edges of the polygon are perpendicular. N indicates the number of edges in the polygon. I is an index for the current edge, and is initially set to "1".

In block 94, edge(I) is compared to the adjacent edge to determine whether the two edges are perpendicular. Any edge in the polygon could be used as the first edge; it is assumed that the edges are numbered in the order of the received vertices. Further, either direction could be used for defining the adjacent section; again, for simplicity, it is assumed that the adjacent edge compared in block 94 is the next edge as defined by the list of vertices.

Depending upon the capabilities of the blt engine, it may be necessary to limit the detection of perpendicular edges in block 94 to perpendicular edges where one side is horizontal and the other side is vertical. This also reduces the complexity of determining whether the edges form a 90 degree angle, since the vertices of one edge will have the same x-coordinate and the vertices of the other edge will have the same y-coordinate.

If the edges are not perpendicular in decision block 94, then Flag is set to "0" in block 96. Unless I=N (i.e., all edges have been checked) in block 98, I is incremented to check the next pair of edges in block 100. If I=N in block 98, all edges have been checked and the polygon cannot be decomposed.

If the edges are perpendicular in decision block 94, then Flag is checked n decision block 102. If Flag equals "1", indicating that the previous pair of edges are perpendicular, then the polygon can be decomposed. If Flag is not equal to "1" (indicating that the previous pair of edges were not perpendicular), then Flag is set to "1" in block 104. Unless I=N in decision block 106, I is incremented to check the next pair of edges in block 107. If I=N in decision block 106, then the first pair of edges are checked in block 108, since angle formed by the first pair of edges is adjacent to the angle formed by the last edge and the first edge and, therefore, consecutive 90 degree angles may be formed by these three edges.

As stated earlier, a polygon may contain multiple rectangular portions. The method shown in FIG. 10 could be used to find the first rectangular region, or could be amended to find all rectangular regions and choose the largest rectangle.

Figure 11A:
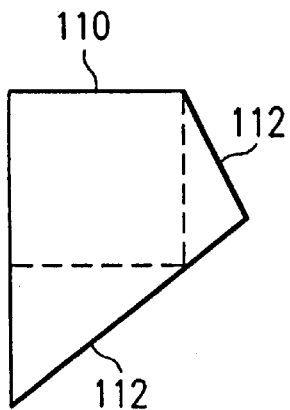
FIGS. 11a and 11b illustrate an alternative method of decomposing a polygon.
Figure 11B:
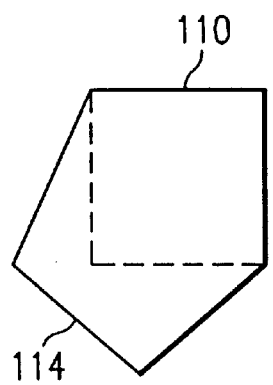
Figure 12:
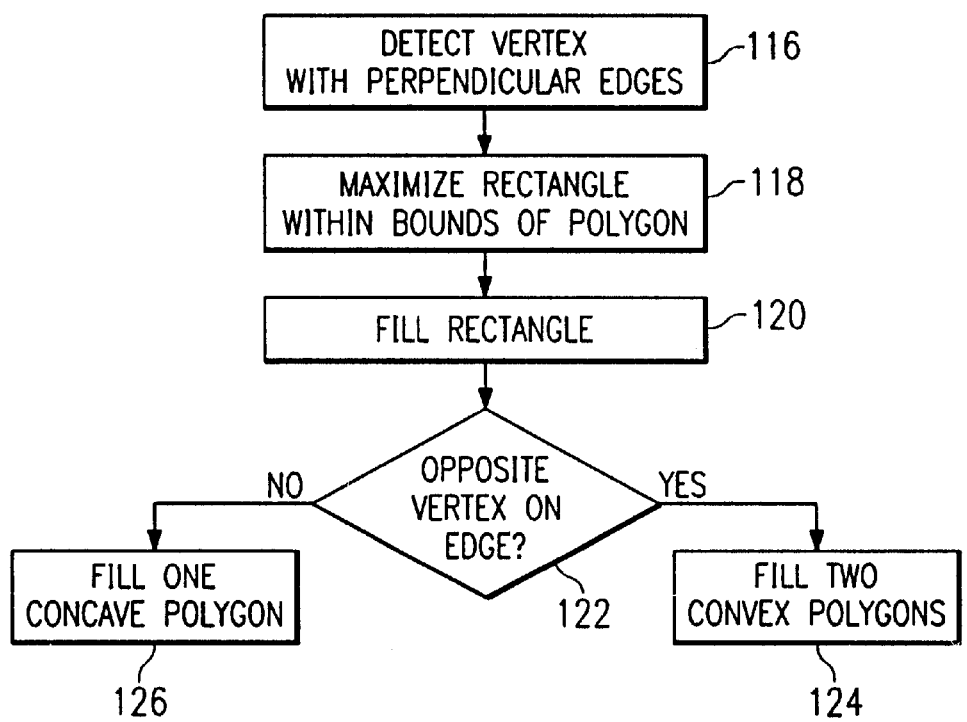
FIG. 12 illustrates a flow chart describing an alternative method of decomposing a polygon to accelerate a polygon fill.

In an alternative embodiment shown in FIGS. 11a–b and 12, a polygon having a single right angle can be decomposed into a rectangle 110 and two convex polygons 112 (FIG. 11a) or a rectangle 110 and a single concave polygon 114 (FIG. 11b). In either case, the rectangle 110 can be filled using the blt engine and the polygon(s) 112 or 114 can be filled using scan conversion, as described above.

A flow chart illustrating this method is shown in FIG. 12. In block 116, a vertex with perpendicular edges is detected. From this vertex, a rectangle can be defined. The rectangle with the maximum area will have either (1) sides equal to the length of the perpendicular edges (FIG. 11a) or (2) a vertex opposite the vertex with the perpendicular edges which is on another edge of the polygon (FIG. 11b). Both cases can be determined using standard geometric techniques. In block 120, if the opposite vertex is on an edge of the polygon, then the two convex polygons are filled in block 124. Otherwise, the concave polygon is filled in block 126.

Although the Detailed Description of the invention has been directed to certain exemplary embodiments, various modifications of these embodiments, as well as alternative embodiments, will be suggested to those skilled in the art. For example, while the determination of whether a polygon is simple convex or complex convex is described as being performed in conjunction with the computer's microprocessor, it would be possible to perform this operation on the video controller. Similarly, decomposition of a simple convex polygon into a rectangle and a smaller polygon could be performed in the video controller.

The invention encompasses any modifications or alternative embodiments that fall within the scope of the Claims.

What is claimed is:

1. A computer implemented method of determining whether a polygon to be displayed in a computer system is a simple convex polygon comprising the steps of:

receiving information defining vertices of the polygon;

determining whether the polygon is convex;

selecting a starting vertex;

determining a direction between a first pair of vertices relative to a predetermined coordinate axis, wherein said first pair of vertices comprises said starting vertex and an adjacent vertex;

for successive pairs of vertices:
determining a direction relative to said predetermined coordinate axis; and
determining whether a change in direction has occurred;

counting the number of changes in direction;

determining a disposition of the starting vertex relative to said predetermined coordinate axis;

determining the polygon is a simple convex polygon in response to the number of direction changes being less than or equal to two if the starting vertex is disposed between two other vertices relative to said predetermined coordinate axis and determining the polygon is a simple convex polygon in response to the number of direction changes being equal to one if the starting vertex is not disposed between two other vertices relative to said predetermined coordinate axis; and using alternate function means to display the polygon in the computer system in response to the step of determining whether the polygon is a simple convex polygon.

2. The method of claim 1 wherein the predetermined coordinate axis is a vertical axis.

3. The method of claim 1 wherein the predetermined coordinate axis is a horizontal axis.

4. Circuitry for determining whether a polygon to be displayed in a computer is a simple convex polygon comprising:

a processor for:
receiving information defining vertices of the polygon;
determining whether the polygon is convex;
selecting a starting vertex;
determining a direction between a first pair of vertices relative to a predetermined coordinate axis, wherein said first pair of vertices comprises said starting vertex and an adjacent vertex;
for successive pairs of vertices:
determining a direction relative to said predetermined coordinate axis; and
determining whether a change in direction has occurred;
counting the number of changes in direction;
determining a disposition of the starting vertex relative to said predetermined coordinate axis; and
determining that the polygon is not a simple convex polygon if the number of direction changes is greater than two and the starting vertex is disposed between two other vertices relative to said predetermined coordinate axis and determining that the polygon is not a simple convex polygon if the number of direction changes is greater than one and the starting vertex is not disposed between two other vertices relative to said predetermined coordinate axis.

5. The circuitry of claim 4 wherein the predetermined coordinate axis is a vertical axis.

6. The circuitry of claim 4 wherein the predetermined coordinate axis is a horizontal axis.

7. A computer implemented method of determining whether a polygon to be displayed in a computer is a simple convex polygon, comprising the steps of:

receiving information defining vertices of the polygon;
determining whether the polygon is convex;
if the polygon is convex, selecting a starting vertex;
determining a direction between a first pair of vertices relative to a predetermined coordinate axis, wherein said first pair of vertices include a starting vertex and an adjacent vertex;
for successive pairs of vertices:
determining a direction relative to said predetermined coordinate axis; and
determining whether a change in direction has occurred;

determining the disposition of the starting vertex in relation to the predetermined coordinate axis; and either comparing the number of changes to a first predetermined threshold for a first disposition of the starting vertex, or comparing the number of changes to a second predetermined threshold for a second disposition of the starting vertex;

determining whether the polygon is a strict convex polygon in response to the comparing step; and using alternate function means relating to the polygon in response to the step of determining whether the polygon is a simple convex polygon.

8. The method of claim 7 wherein said first disposition of the starting vertex occurs when the starting vertex is disposed between two other vertices relative to the predetermined coordinate axis and wherein said first predetermined threshold equals two.

9. The method of claim 8 further including the step of concluding the polygon is a simple convex polygon if said number of changes is greater than said first predetermined threshold.

10. The method of claim 7 wherein said second disposition occurs when the starting vertex is not disposed between two other vertices relative to said predetermined coordinate axis and wherein said second predetermined threshold equals one.

11. The method of claim 10 further including the step of concluding the polygon is a simple convex polygon if said number of changes is greater than said second predetermined threshold.

12. A computer implemented method of determining whether a polygon to be displayed in a computer is a simple convex polygon, comprising the steps of:

receiving information defining vertices of the polygon;
determining whether the polygon is convex;
if the polygon is convex, selecting a starting vertex and selecting a coordinate axis;
determining a direction between a first pair of vertices relative to said selected coordinate axis, wherein said first pair of vertices comprises the starting vertex and an adjacent vertex;
for successive pairs of vertices, determining a direction relative to said selected coordinate axis and determining whether a change in direction has occurred;
determining if the starting vertex is disposed between two other vertices relative to said selected coordinate axis;
comparing the number of changes in direction relative to the selected coordinate axis to a first predetermined threshold if the starting vertex is not disposed between two other vertices relative to said selected coordinate axis and to a second predetermined threshold if the starting vertex is disposed between two other vertices relative to said selected coordinate axis; and
using alternate function means to display the polygon in the computer system in response to the step of determining whether the polygon is a simple convex polygon.

13. The method of claim 12 wherein said first predetermined threshold is one and further including the step of determining that the polygon is a simple convex polygon if the number of changes in direction is less than or equal to said first predetermined threshold.

14. The method of claim 12 wherein said second predetermined threshold is two and further including the step of determining that the polygon is a simple convex polygon if the number of changes in direction is less than or equal to the second predetermined threshold.

15. A computer implemented method of determining whether a polygon is a simple convex polygon, comprising the steps of:

receiving information defining vertices of the polygon;

determining whether the polygon is convex;

selecting a starting vertex;

selecting either the X or Y coordinate axis;

determining a direction between a first pair of vertices relative to the selected coordinate axis, wherein said first pair of vertices comprises said starting vertex and an adjacent vertex;

for successive pairs of vertices:

determining a direction relative to the selected coordinate axis; and determining whether a change in direction has occurred;

counting the number of changes in direction;

determining whether the starting vertex is disposed between two other vertices relative to the selected coordinate axis; and determining the polygon is a simple convex polygon in response to the number of direction changes being less than or equal to two if the starting vertex is disposed between two other vertices relative to the selected coordinate axis and determining the polygon is a simple convex polygon in response to the number of direction changes being equal to one if the starting vertex is not disposed between two other vertices relative to the selected coordinate axis; and displaying the polygon using simpler code or accelerated hardware features in response to determining that the polygon is a simple convex polygon.

* * * * *